Feb. 19, 1929.                                                        1,702,808
J. BRENZINGER
SOLDERING MECHANISM
Filed June 1, 1927          2 Sheets-Sheet 1
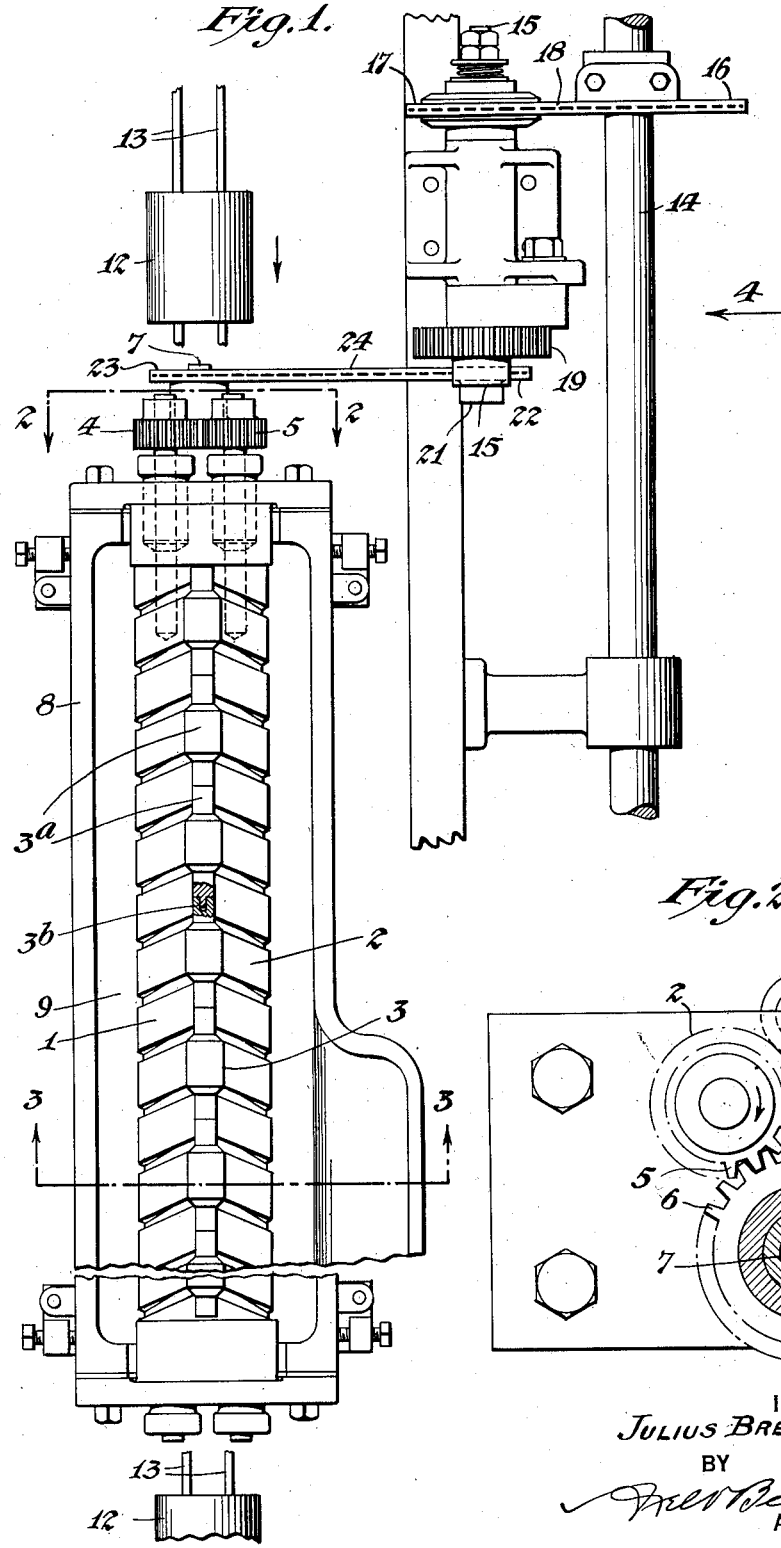
Fig. 1.
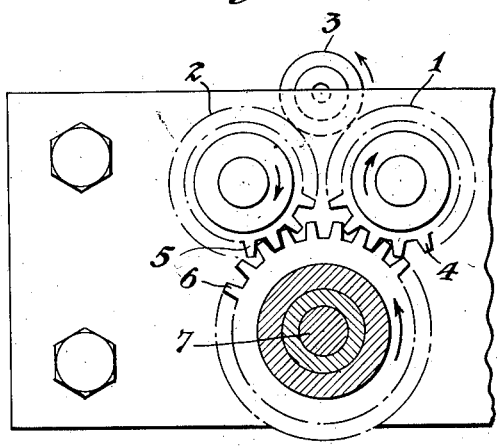
Fig. 2.
INVENTOR
JULIUS BRENZINGER
BY
ATTORNEY Feb. 19, 1929.　　　　J. BRENZINGER　　　　1,702,808

SOLDERING MECHANISM

Filed June 1, 1927　　　2 Sheets-Sheet 2

INVENTOR
JULIUS BRENZINGER
BY
ATTORNEY

Patented Feb. 19, 1929.

1,702,808

UNITED STATES PATENT OFFICE.

JULIUS BRENZINGER, OF FAIRFIELD, CONNECTICUT, ASSIGNOR TO THE MAX AMS MACHINE COMPANY, OF BRIDGEPORT, CONNECTICUT, A CORPORATION OF NEW YORK.

SOLDERING MECHANISM.

Application filed June 1, 1927. Serial No. 195,669.

This invention relates to soldering mechanism, and has more particularly reference to the class of devices used in connection with the soldering operation employed in soldering the longitudinal side seam of a can body.

In the art of soldering side seams as now employed it is customary to employ a solder-applying roller rotating in a bath of molten solder, said roller coming in contact with and applying solder to the side seams of bodies as they pass over the roller. Certain difficulties have been encountered in this construction notably when acting on cans composed of decorated tin where the margin to which solder can be applied is relatively narrow. It will be understood that in such cases the solder-applying roller is apt to apply too wide a solder seam because it has to be relatively large to reach into the body of solder and consequently its circumference presents a relatively large curve. Also when changing from one size of can to another considerable work is entailed in adjusting the machine.

The main object and feature of this invention is to provide means whereby a relatively narrow line of solder can be applied to the can body, and whereby also the machine can be easily adjusted to act on different sizes of cans.

In the accompanying drawings the invention is disclosed in a concrete and preferred form in which:

Fig. 1 is a top plan view of a soldering mechanism with parts broken away.

Fig. 2 is a transverse sectional view substantially on the plane of line 2—2 of Fig. 1.

Figure 3:
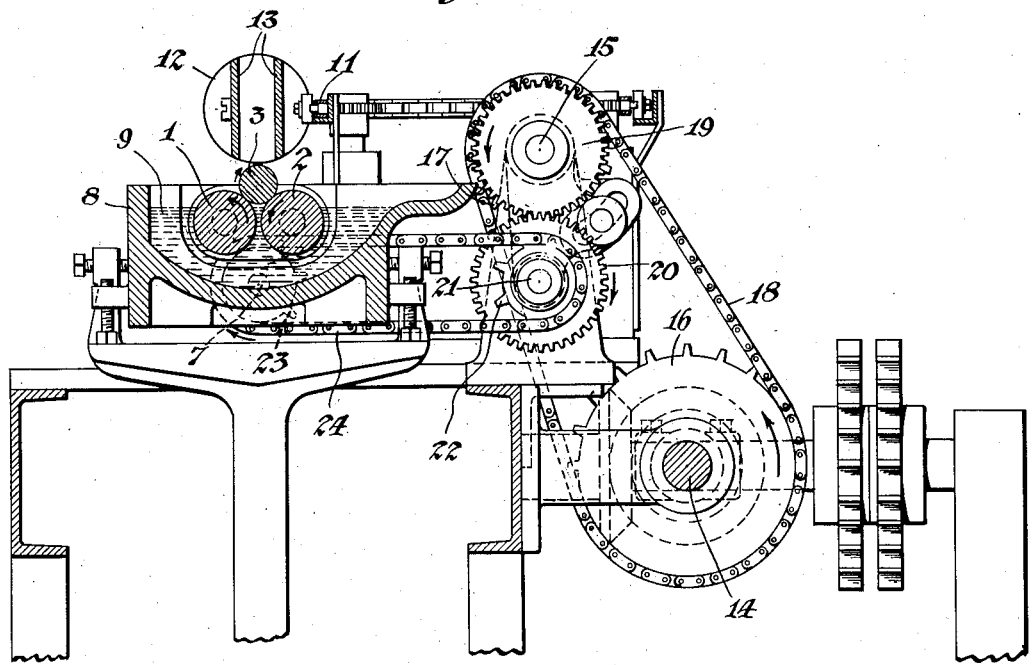
Fig. 3 is a transverse sectional view substantially on the plane of line 3—3 of Fig. 1.
Figure 4:
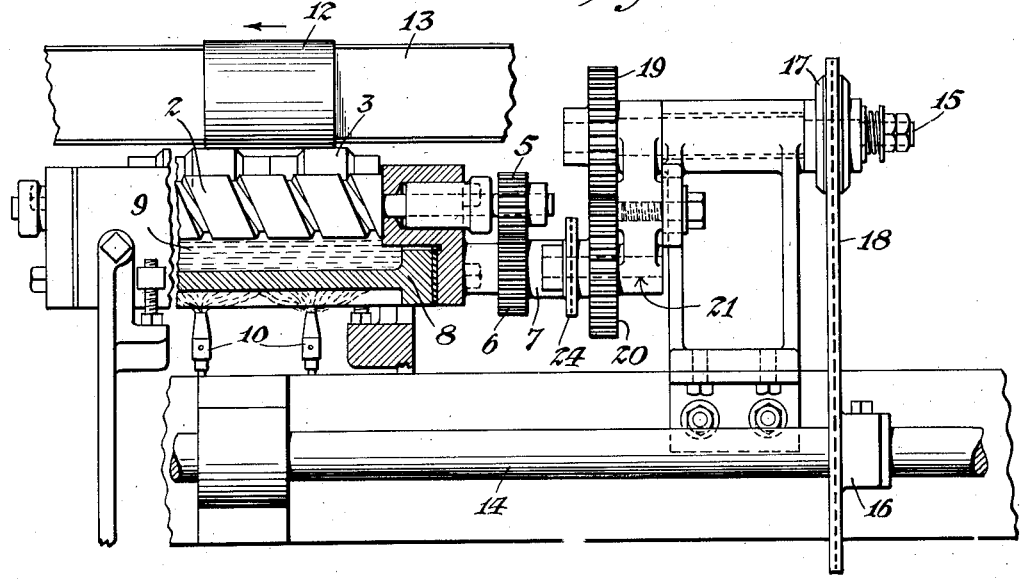
Fig. 4 is a view looking in the direction of arrow 4 of Fig. 1 with parts broken away and in section.

1 and 2 indicate two parallel spaced-apart supporting or feed rollers, and 3 is a solder-applying roller resting in the valley between the supporting rollers. In the present instance roller 3 rests loosely between the supporting rollers and is frictionally driven by them, said supporting rollers being driven in opposite directions by reason of pinions 4 and 5 meshing with intermediate gear 6 on shaft 7. 8 indicates a container holding a body of molten solder 9, said solder being maintained at the requisite temperature by heaters 10. Rollers 1 and 2 are immersed in the solder. 11 is a conventional representation of a conveyor that moves can bodies as 12 lengthwise over guides 13 located above the container or tank in a manner well understood.

It will now be understood that rotation of the feed rollers conveys solder from the tank to the solder-applying roller, which latter also rotates and places the solder in the can body. It will be observed from Fig. 3 that in this way a solder-applying roller of relatively small diameter can be employed.

The solder-applying roller may be simply a smooth roller, of uniform diameter throughout, which is placed loosely in the valley between the two supporting rollers. By reason of this arrangement said roller can be easily removed and another one of a different diameter substituted when changing from one diameter of can body to another. In the particular form here disclosed it is preferred to make the solder-applying roller of a series of members $3^a$ arranged end to end and inter-engaging end to end by reason of interlocking parts $3^b$ shown in Fig. 1. These members also rest loosely between the two supporting rollers and are removable in the same way as a single shaft or member would be. The advantage of having the solder-applying roller composed of a number of members is that this construction allows of a certain amount of flexibility.

Shaft 7 may be driven in any suitable way. As here shown power is derived from shaft 14 and is transmitted to stub shaft 15 by means of sprockets 16 and 17 and chain 18. Stub shaft 15 is provided with a gear 19 meshing with pinion 20 on shaft 21 and from this latter shaft motion is imparted to shaft 7 by means of sprockets 22 and 23 and chain 24.

I claim:

1. Soldering mechanism including: a container holding a body of molten solder, two spaced-apart parallel feed rollers immersed in the solder, a solder-aplying roller resting in the valley between and in engagement with the feed rollers to receive solder therefrom, and means for rotating the rollers.

2. Soldering mechanism including: a container holding a body of molten solder, two spaced apart parallel feed rollers immersed in the solder, and a solder-applying roller resting loosely in the valley between and in engagement with the feed rollers.

3. Soldering mechanism including: a container holding a body of molten solder, two spaced-apart parallel feed rollers driven in opposite directions and immersed in the solder, and a solder-applying roller resting in the valley between and in engagement with the feed rollers, frictionally driven thereby and receiving solder therefrom.

Signed at Bridgeport, in the county of Fairfield and State of Connecticut, this 24th day of May 1927.

JULIUS BRENZINGER.